US007634706B1

(12) United States Patent  (10) Patent No.: US 7,634,706 B1
Chen et al.  (45) Date of Patent: Dec. 15, 2009

(54) MAJORITY-DETECTED ERASURE ENHANCED ERROR CORRECTION

(75) Inventors: Michael H. Chen, Westminster, CO (US); Rajita Shrestha, Westminster, CO (US); James C. Alexander, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 729 days.

(21) Appl. No.: 11/481,078

(22) Filed: Jul. 5, 2006

Related U.S. Application Data

(60) Provisional application No. 60/738,716, filed on Nov. 22, 2005.

(51) Int. Cl.
    *H03M 13/43* (2006.01)
(52) U.S. Cl. .................................................... 714/760
(58) Field of Classification Search ................ 714/752, 714/760
    See application file for complete search history.

(56) References Cited

U.S. PATENT DOCUMENTS

| | | | |
|---|---|---|---|
| 4,404,674 A | | 9/1983 | Rhodes |
| 4,763,331 A | * | 8/1988 | Matsumoto ................. 714/759 |
| 5,321,703 A | * | 6/1994 | Weng ......................... 714/797 |
| 5,864,654 A | | 1/1999 | Marchant |
| 5,995,559 A | * | 11/1999 | Hedberg ..................... 375/340 |
| 6,038,679 A | | 3/2000 | Hanson |
| 6,044,487 A | * | 3/2000 | Li ............................... 714/797 |

(Continued)

OTHER PUBLICATIONS

U.S. Appl. No. 60/738,716, filed Nov. 22, 2005, entitled Majority-Detected Erasure Enhanced Error Correction, by Michael H. Chen, 7 pages.

*Primary Examiner*—Stephen M Baker
(74) *Attorney, Agent, or Firm*—Westman, Champlin & Kelly, P.A.

(57) ABSTRACT

A system for enhancing the error correction capability of an error correction code ("ECC") during error recovery operations accumulates, for respective bits, counts of the number of times the bits are detected as 1s in multiple re-reads of a data signal. The system then determines, based on the associated count, if a reconstructed bit should be considered a 1 or 0, or neither, that is, if the reconstructed bit should be considered erroneous, by comparing the count to a majority detection threshold and then to either an upper or a lower predetermined threshold that corresponds to the confidence with which the bit is reconstructed as a either a 1 or a 0. If the confidence is sufficiently low, that is, if the count falls below the upper threshold or above the lower threshold, the reconstructed bit is flagged as erroneous. After all of the bits are reconstructed, the system groups the bits into symbols to reproduce the ECC codeword, and sets erasure pointers that identify the locations of a predetermined number, s, of the symbols that are associated with the highest degree of uncertainty, that is, the largest numbers of flagged bits or, as appropriate, the largest numbers of flagged bits with the lowest confidence levels. The error correction operation then decodes the symbols in the identified locations as erasures. The system, using an (n, k) distance d Reed-Solomon ECC uses 2t=n−k redundancy symbols to correct the s erasures and up to $$\frac{2t-s}{2}$$

errors.

20 Claims, 4 Drawing Sheets

U.S. PATENT DOCUMENTS 6,519,740 B1 2/2003 Martensson
6,981,205 B2 * 12/2005 Fukushima et al. ......... 714/797
2003/0196159 A1 10/2003 Kondo et al.
2005/0262423 A1 11/2005 Liu et al.

* cited by examiner

MAJORITY-DETECTED ERASURE ENHANCED ERROR CORRECTION

CROSS-REFERENCE TO RELATED APPLICATIONS

The present application claims the benefit of U.S. Provisional Patent Application Ser. No. 60/738,716, which was filed on Nov. 22, 2005, by Michael H. Chen and Rajita Shrestha for a MAJORITY-DETECTED ERASURE ENHANCED ERROR CORRECTION and is hereby incorporated by reference.

BACKGROUND OF THE INVENTION

1. Field of the Invention

The invention relates generally to error correction systems and, more particularly, to systems for error and erasure detection and correction.

2. Background Information

Before data are transmitted over a communications channel to a receiver or a data is storage device, the data are typically encoded to allow for error detection and/or correction. The error correction/detection encoding manipulates the data in accordance with a distance d error correction code ("ECC"), to produce ECC codewords that include the data and associated redundancy information. To decode the data and associated redundancy information from received or retrieved signals, the decoder first recovers the bits and then groups the bits into symbols or sequences of appropriate length for the ECC, and thus, reproduces the ECC codewords. The system next decodes the ECC codewords using the ECC to produce, if possible, error-free data. Typically, an (n, k) distance d Reed-Solomon ECC is used to encode data that are to be stored for later retrieval, and the ECC decoder is an on-the-fly hardware decoder that detects and corrects up to "t" errors using 2t=n−k redundancy symbols, where the minimum distance is $d_{min}=2t+1$.

When a sector of a storage medium is "marginal," such that retrieval of the data stored therein is impaired by, for example, a defect in the medium or a degradation of the signal that represents the data, the system may determine that the stored data contains more errors than the ECC can correct. The system then tries to recover the data through error recovery operations. Generally, the error recovery operations involve up to a predetermined number of sector re-reads in which the error correction operations are performed independently for the respective re-reads.

The error recovery operations may include re-reading the sector with the head at various off-track positions, with an increased bias current, using modified filter responses, and so forth, to improve the quality of the readback signal. However, such attempts may not recover the data such that the number of errors included therein is within the correction capability of the ECC.

Another error recovery technique referred to as "majority detection" is described in United States Patent Application Publication US 2005/0262423 entitled Majority Detection In Error Recovery, which has a common assignee and is incorporated herein in its entirety by reference. Using majority detection, the system keeps track of the respective bits for multiple re-reads and determines, that is, votes, which bits are likely to be 1's based on the values of the recovered bit signals in each of the re-reads. A bit signal that is detected as a 1 in more than, for example, one-half of the re-reads, is "voted" as a 1. Otherwise, the bit is voted as a 0. The results of the voting are used to reconstruct the ECC codeword, which is then presented to the ECC decoder.

While the majority detection operations work well, and significantly increase the likelihood that the data are recovered from the marginal sector, the operations are constrained by the error detection/correction capability of the ECC. To further increase the likelihood of data recovery, the system could include more redundancy in the stored ECC codewords, however, fewer information symbols could then be included in the sector. Further, such a system would have to be more complex, to operate with the more powerful ECCs.

Accordingly, what is needed is a system or technique to enhance the error correction capability of the ECC during error recovery operations.

SUMMARY OF THE INVENTION

The invention is a system for enhancing the error correction capability of the error correction code ("ECC") during error recovery operations by performing, outside of the ECC decoding, error detection operations that identify the probable locations of errors in the data. As described in more detail below, the system determines the locations of up to a predetermined number of ECC codeword symbols that are most likely erroneous and uses erasure pointers to identify the locations to the ECC decoding operation. The ECC decoding operation then utilizes the codeword ECC redundancy symbols to correct the errors in the identified locations as erasures and also to detect and correct errors in the remaining ECC codeword symbols. The number of symbols that can be corrected using the redundancy symbols is thus increased over the number of symbols that could be corrected if the redundancy symbols were used for all of the error detection and correction operations.

More specifically the system accumulates, for the respective bits, counts of the number of times the bits are detected as 1's in multiple re-reads of the sector. The system then determines, based on the associated count, if a reconstructed bit should be considered a 1 or a 0, or neither, that is, if the reconstructed bit should be considered erroneous. The system thus compares the count to a majority detection threshold and then to either an upper or a lower predetermined threshold that corresponds to the confidence with which the bit can be reconstructed as either a 1 or a 0. If the confidence is sufficiently low, the reconstructed bit is flagged as erroneous. After all of the bits are reconstructed, the system groups the bits into symbols and sets erasure pointers that identify the locations of a predetermined number of the symbols that include the highest uncertainty in the detected bits, that is, the largest numbers of flagged bits or, as appropriate, the largest numbers of bits that are associated with counts that correspond to the lowest confidence levels.

The error correction operation then decodes the symbols in the identified locations as erasures. As is understood by those skilled in the art, an (n, k) distance d Reed Solomon ECC uses 2t=n−k redundancy symbols to correct up to t errors, where the minimum distance is $d_{min}=2t+1$. The same ECC can correct up to 2t erasures, or up to a maximum of $$\frac{2t-s}{2}$$

errors plus s erasures. Thus, when erasures are identified, the error correction capability of the ECC is enhanced over what it would be for error correction alone.

The inventive system utilizes the enhanced error correction capabilty to recover data that would otherwise be labeled as uncorrectable, or bad, because the number of errors exceeds the error correction capability of the ECC. Further, the system does this without increasing the complexity of the error correction hardware.

BRIEF DESCRIPTION OF THE DRAWINGS

The invention description below refers to the accompanying drawings, of which.

DETAILED DESCRIPTION OF AN ILLUSTRATIVE EMBODIMENT

We describe the system in terms of recovering data that are stored on a storage medium. The system operates in essentially the same manner to recover a buffered transmitted signal.

Figure 1:
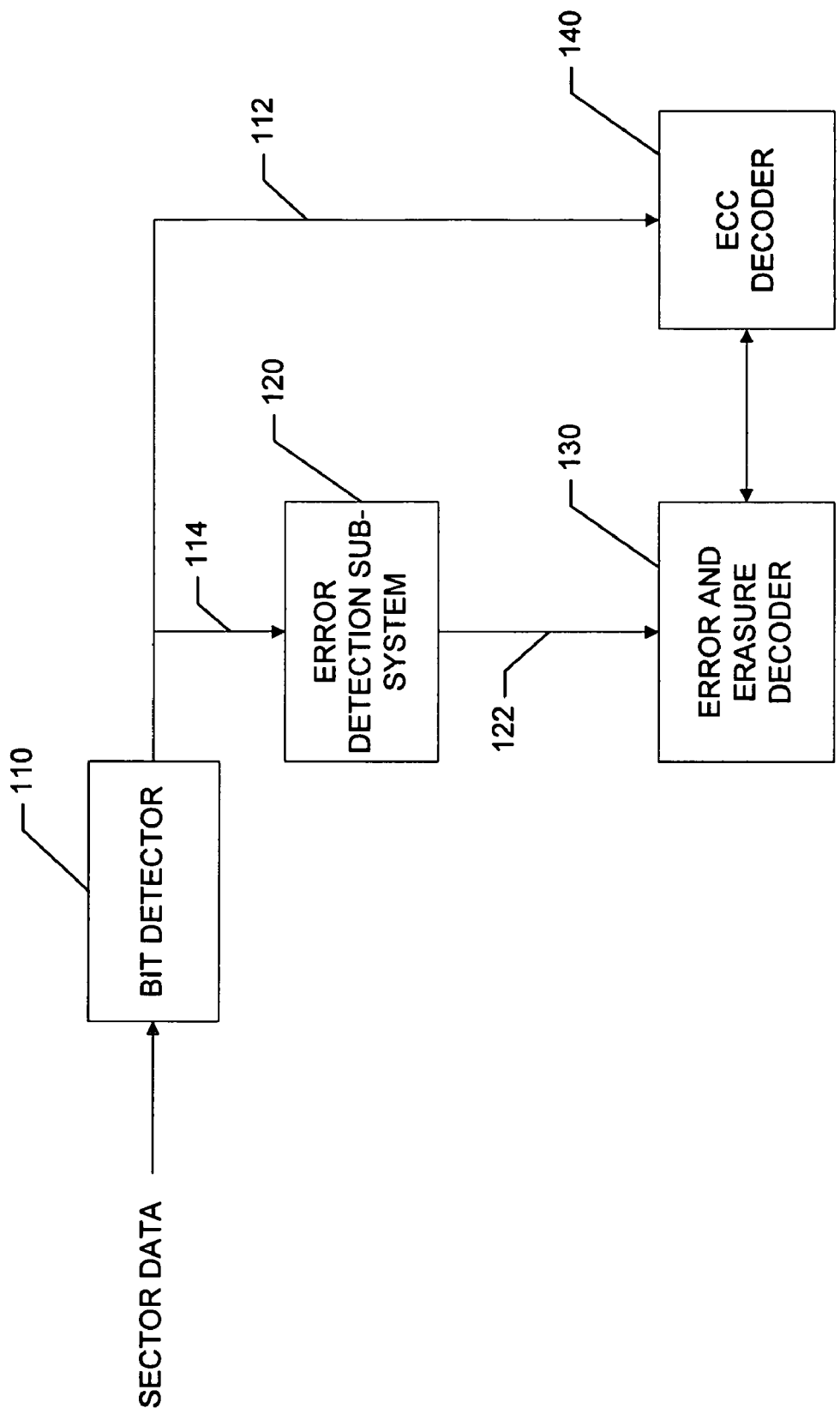
FIG. 1 is a functional block diagram of a system constructed in accordance with the invention.

Referring now to FIG. 1, an enhanced error correction system 10 that is used for error recovery operations includes a bit detector 110 that operates in a known manner to assign values of 1 or 0 to signals that are read from a sector of a storage medium (not shown). The bit detector 110 provides the bit values over line 114 to an error detection sub-system 120 that accumulates, for the respective bits, counts of the number of times that the bits are determined to be 1's. The bit detector 110 may also provide the bit values over line 112 to the ECC decoder 140, which may for each re-reading of the sector perform an error correction operation to determine if the retrieved data can be decoded to error-free data. If the ECC decoder successfully decodes the data to error-free data, the system ends the error recovery operation. Otherwise, the system continues re-reading the sector until the sector has been re-read a predetermined number of times. In the example, the predetermined number of times is 15, though in practice the number of times may be selected to be essentially any number that can be completed within the duration of an associated error recovery time-out.

At the end of the predetermined number of re-reads, the error detection subsystem 120 reconstructs the values of the respective bits by comparing the counts to a majority detection threshold. The sub-system also determines the confidence level associated with the bit values using upper and lower thresholds, as discussed in more detail below with reference to FIGS. 2 and 3. The error detection sub-system then sets flags for those bits for which the associated confidence levels are sufficiently low. In the example, the system reconstructs a bit with a count of greater than 7 as a 1 and flags the bit if the count is less than or equal to an upper threshold, which in the example is 10. Similarly, in the example, the system sets a bit with a count of 7 or less to a 0 and flags the bit if the count is greater than a lower threshold, which in the example is 4. The upper and lower thresholds are programmable and may be set to any values above and below the value used for the majority detection threshold. Further, the upper and lower thresholds may but need not be equal distances from the majority detection threshold.

After all of the bits have been assigned values, or reconstructed, the error detection sub-system 120 regroups the bits into symbols and identifies as erroneous a predetermined number "s" of the symbols that are associated with the highest degree of uncertainty in the detected bits. As discussed below, the system identifies as erasures the s symbols with the largest number of flagged bits or, as appropriate, the s symbols with the largest number of bits that have counts that are associated with the lowest confidence levels. The error detection sub-system then sets erasure pointers that identify the locations of the erroneous symbols in the reconstructed ECC codeword, and provides the reconstructed ECC codeword and the erasure pointers over lines 122 to an error and erasure decoder 130. The decoder 130 operates in a known manner to detect up to $$\frac{2t-s}{2}$$

errors in the ECC codeword symbols that are not identified as erasures and correct the identified erasures and detected errors in accordance with an (n, k) distance d error correction code ("ECC"). In the example, the ECC is an (n, k) distance d Reed Solomon code and the decoder 130 corrects up to $$\frac{2t-s}{2}$$

errors plus s erasures using 2t=n–k codeword redundancy symbols, where $d_{min}=2t+1$. The decoder 130 preferably utilizes the hardware of the ECC decoder 140 to perform certain of the error detection and error and erasure correction operations.

Figure 2:
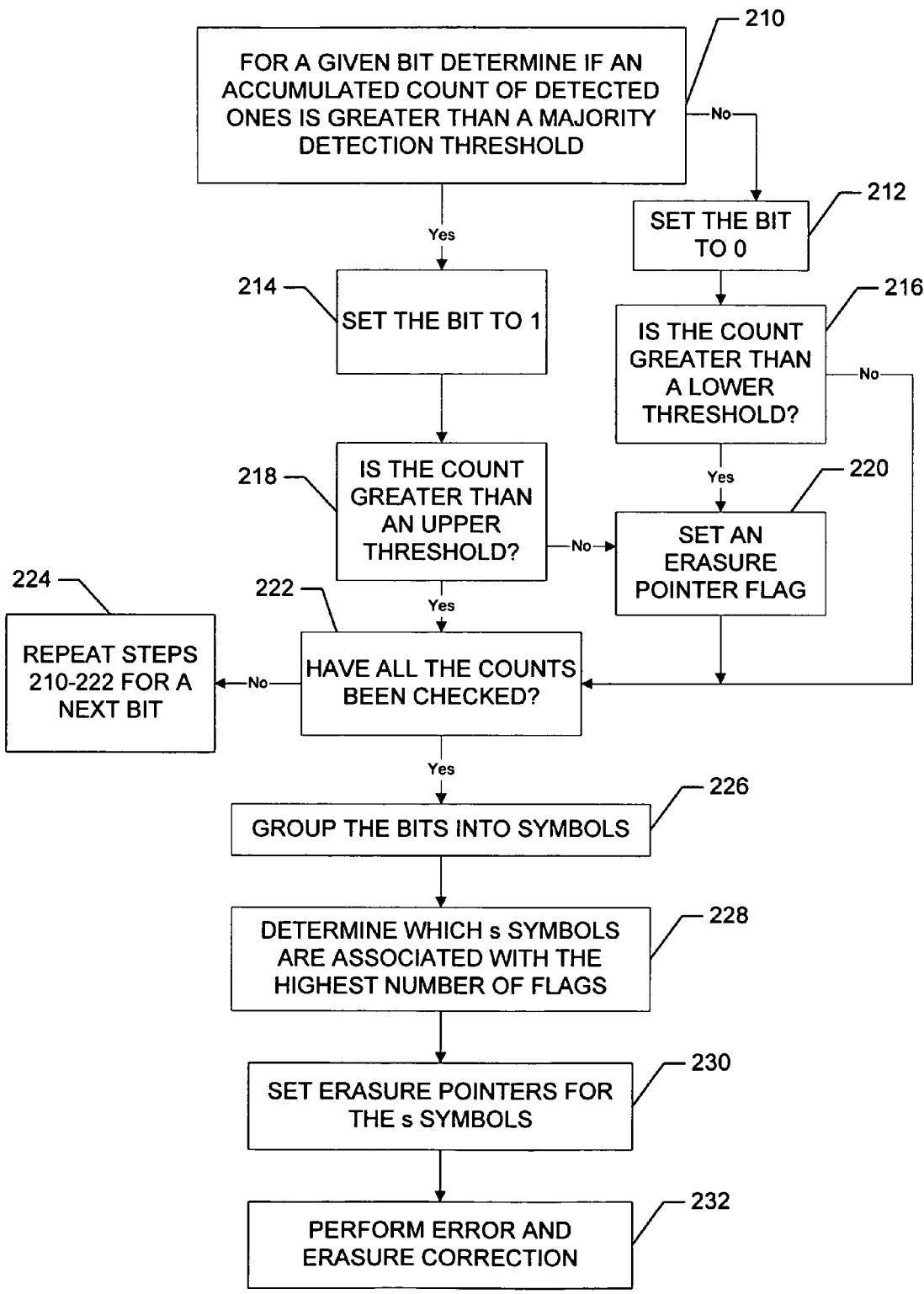
FIG. 2 is a flow chart of the operations of an error detection sub-system that is included in the system of FIG. 1.
Figure 3:
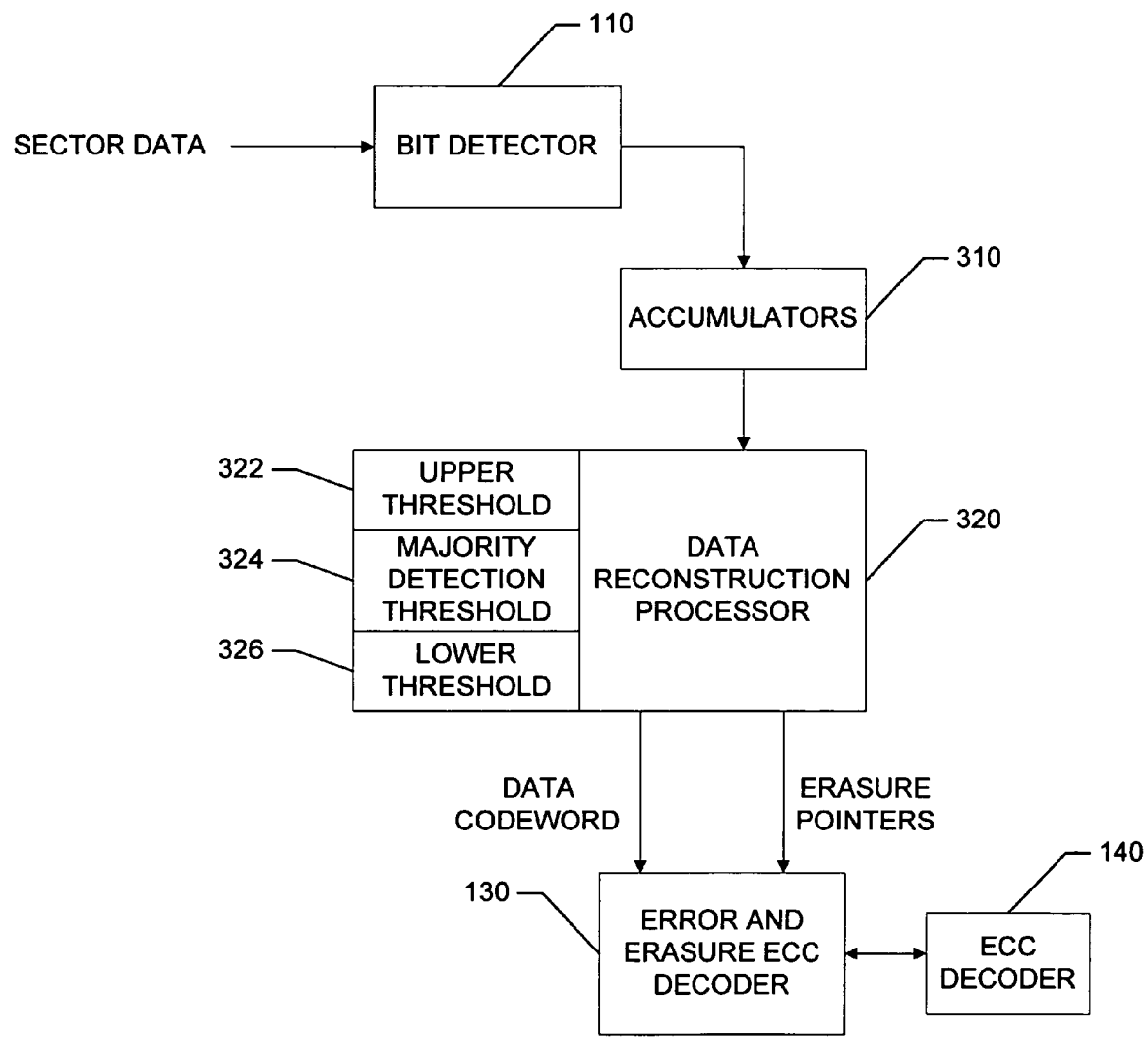
FIG. 3 is a more detailed functional block diagram of the error detection subsystem.

The operations of the error detection sub-system are now described in more detail with reference to FIGS. 2-4.

In an error recovery operation, sector data for each re-read are supplied to the bit detector 110, which operates in a known manner to detect the signal values associated with the respective bits and assign bit values, that is, 1s or 0s to the bits. The bit values determined by the bit detector 110 are supplied to accumulators 310, which for the respective bits accumulate counts that are equal to the number of times the given bits are detected as Is in the multiple re-reads. At the completion of the predetermined number of retries, the counts in the accumulators 310 are provided to a data reconstruction processor 320, which compares each of the counts to a majority detection threshold 324, to determine whether the corresponding bit should be reconstructed as a 1 or a 0. The processor further compares the count to one of either an upper threshold 322 or a lower threshold 326 to determine whether or not the bit should be flagged as most likely erroneous.

The data reconstruction processor 320 thus compares the count to a majority detection threshold which is generally equal to one-half the number of re-reads. (step 210). If the count exceeds the majority detection threshold, the data reconstruction processor reconstructs the bit as a 1 (step 214). The data reconstruction processor also compares the count to an upper threshold, to determine if the confidence level associated with the bit value is sufficiently low that the bit should be considered erroneous, that is, neither a 1 nor a 0 (step 218).

Thus, in the example, the data reconstruction processor 320 compares the count with an upper threshold of 10, to determine how likely it is that the bit should be considered a 1. If the count exceeds the threshold, that is, if more than 10 of the 15 re-read operations detected the bit as a 1, the confidence level associated with assigning the bit a value of 1 is sufficiently high and the bit is not flagged as erroneous. If, however, the bit is detected as a 1 between 8 and 10 times, the associated confidence level is low, and the processor sets a flag to denote what could be an erroneous bit (step 220).

If the count for a given bit is less than the majority detection threshold, the data bit reconstruction processor sets the bit to 0. The confidence with which the bit is set to a 0 is then assessed by determining if the associated count is greater than a lower threshold, which in the example is 4 (steps 212, 216). If the count is greater than 4, the data reconstruction processor sets a flag, to denote what could be an erroneous bit (step 220).

The data reconstruction processor 320 then groups the bits into multi-bit symbols that are used for error correction, to reconstruct the ECC codeword (step 226). Next, the data reconstruction processor determines which s codeword symbols are associated with the highest uncertainty in the detected bits. In this example, the processor determines which s symbols are associated with the largest number of flagged bits (step 228). These s symbols are treated as erasures, and the processor sets erasure pointers to identify the locations of the symbols in the ECC codeword. The data reconstruction processor then sends the reconstructed ECC codeword and the erasure pointers to the error and erasure decoder 130, which operates in a known manner using the ECC decoder hardware to correct the s symbols that are identified as erasures and to detect and correct up to $$\frac{2t-s}{2}$$

errors in the remaining ECC codeword symbols.

Figure 4:
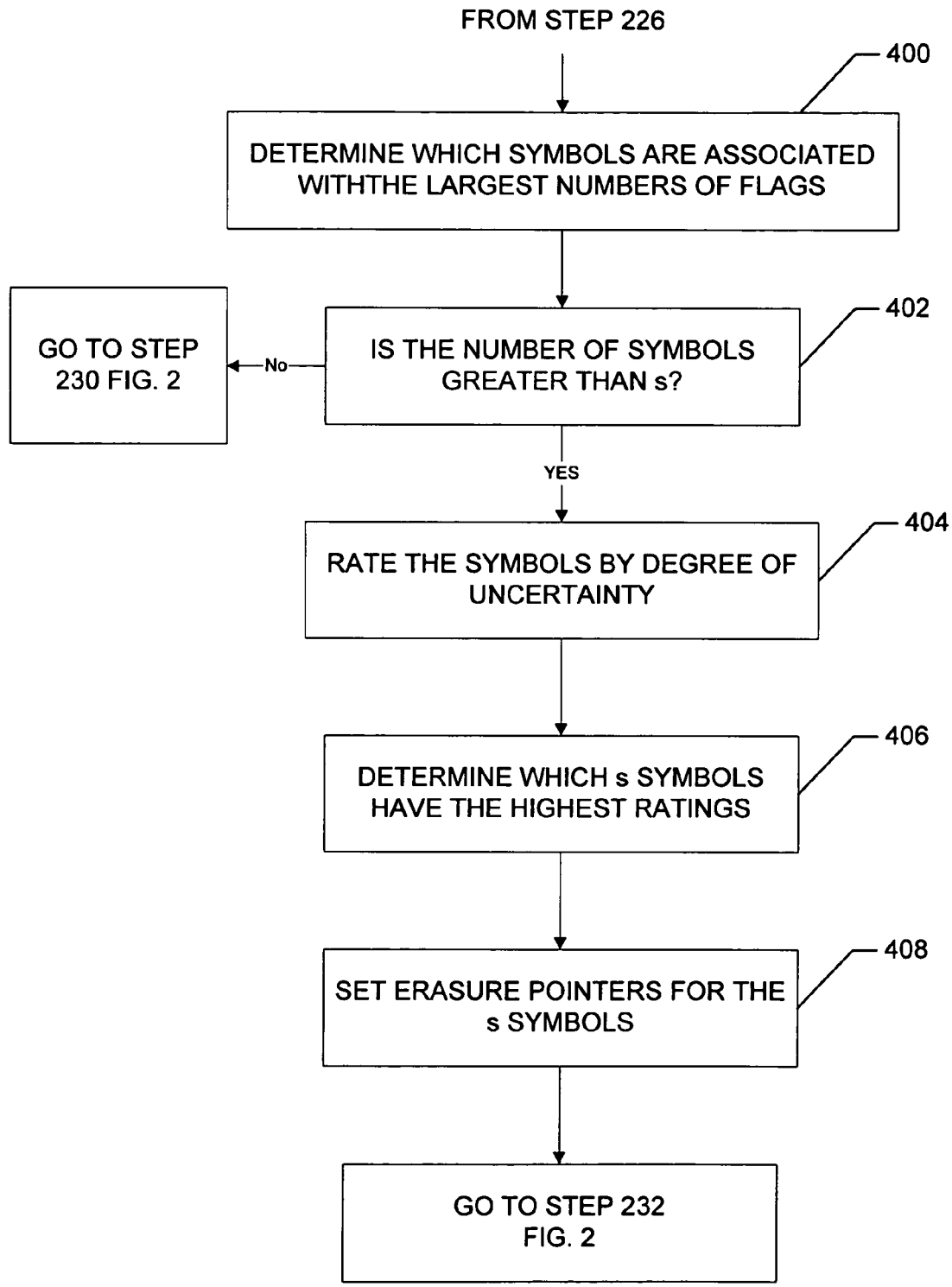
FIG. 4 is a functional block diagram of an alternative operation of the error detection subsystem.

Referring now to FIG. 4, the data reconstruction processor 320 may, after grouping the bits into symbols (step 226, FIG. 2), determine that more than s symbols are associated with the largest number of flagged bits (steps 400, 402). For example, the processor may determine that g symbols each have f flags set, where g>s. The processor next determines the degrees of uncertainty for the respective g symbols, based on the counts associated with the flagged bits (step 404). Thus the processor "rates" the symbols based on how close the counts of the respective flagged bits are to the majority detection threshold, that is, to the lowest confidence levels for setting the bit values. In the example, the largest number of flags set per symbol is f=3. The processor gives a highest rating to a symbol with, for example, 3 flagged 0 bits that have each have a count is of 7, that is, that each have a count associated with the lowest confidence level for setting a bit to 0. The processor gives a lower rating to a symbol that has, for example, a 0 bit with a count of 7, a 1 bit with a count of 8 and another 1 bit with a count of 9, and so forth. After rating all g of the symbols, the processor identifies as erasures the s symbols with the highest ratings (steps 406, 408). Thus, the processor identifies as erasures the s symbols most likely to contain bit values that are incorrectly set. The processor then performs the error and erasure correction operations as discussed above with reference to step 232 of FIG. 2.

The number of erasure pointers that are used in the system is selected to be less than the total erasure correction capability of the ECC. In this way, the system can detect symbols in the ECC codeword that have been reconstructed incorrectly but not identified as erasures. There is thus a trade-off between using the maximum correction capability of the ECC for erasure decoding and the ability to detect erroneously reconstructed symbols that have bits that are associated with higher confidence levels and thus correct a smaller number of symbols.

In the example, the number of erasure pointers is selected to be one-half the error correction capability of the ECC. In this way, the error correction capability of the ECC is enhanced by the inclusion of the erasures to correct one and one-half times the number of symbols the ECC could correct as undetected errors. Thus, for an ECC that can detect and correct up to 20 erroneous symbols using 40 redundancy symbols, the system utilizes 10 erasure pointers, to correct 10 erasures and detect and correct up to 15 errors, or a total of 25 erroneous symbols.

Before performing the error and erasure decoding, the system may attempt to correct the errors in the majority-detected reconstructed ECC codeword by applying the ECC codeword directly to the ECC decoder 140. However, this majority detection decoding operation need not be performed. Further, the step of providing of the detected bit information to the ECC decoder after each re-read, as described above with reference to FIG. 1, may but need not be performed during the error recovery operation.

Certain processors are shown as separate devices but may be combined. Various is operations may be performed in hardware, software or firmware or any combination thereof.

The term sector is used herein generally to refer to a data storage unit of a data storage device. The data storage device may be a disk drive, a tape drive or a solid state device.

The foregoing description has been limited to specific embodiments of this invention. It will be apparent, however, that variations and modifications may be made to the invention, such as counting 0s instead of 1s in the re-read operations, flagging only 1s or only 0s as most likely erroneous, and so forth, with the attainment of some or all of its advantages. Therefore, it is the object of the appended claims to cover all such variations and modifications as come within the true spirit and scope of the invention.

What is claimed is:

1. An error recovery system including:

a bit detector that detects bits in a data signal and assigns values of 1 and 0 to the detected bits;

accumulators that determine counts of the numbers of times respective bits are assigned values of 1 in re-reads of the data signal;

a data reconstruction processor that assigns values of 1 to respective bits with associated counts that are greater than a majority detection threshold and values of 0 to respective bits with associated counts that are less than the majority detection threshold, sets flags for bits with values of 1 and associated counts that are less than a predetermined upper threshold and for bits with values of 0 and associated counts that are greater than a predetermined lower threshold, groups the bits into symbols and sets erasure pointers to identify the locations of a predetermined number, s, of the symbols that are associated with the highest degree of uncertainty in the detected bits; and an error and erasure decoder that corrects the s symbols in the identified locations as erasures and detects and corrects up to $$\frac{2t-s}{2}$$

errors using a distance d error correction code, where the minimum distance $d_{min}=2t+1$.

2. The error recovery system of claim 1 wherein s is selected to be equal to the erasure correction capability of the error correction code.

3. The error recovery system of claim 1 wherein the data signal is read from a data storage device.

4. The error recovery system of claim 1 wherein the data signal is a received signal.

5. The error recovery system of claim 1 wherein the erasure pointers are set for the s symbols that contain the largest numbers of flagged bits.

6. The error recovery system of claim 1 wherein the erasure pointers are set to identify the s symbols that have the largest number of bits that are associated with the lowest confidence levels.

7. A method of recovering data including the steps of
detecting bits in a data signal and assigning values to the bits;
determining counts of the number of times respective bits are detected as a particular value in multiple re-reads of the data;
reconstructing a ECC codeword by
assigning the particular value to bits that are associated with counts that are greater than a predetermined majority threshold,
assigning a different value to bits that are associated with counts that are less than the predetermined majority threshold,
setting flags for the bits that have been assigned the particular value and have associated counts that are less than a predetermined upper threshold,
setting flags for the bits that have been assigned the different value and have associated counts that are greater than a predetermined lower threshold,
grouping the bits into ECC codeword symbols, and
setting erasure pointers that identify the locations in the ECC codeword of a predetermined number s of the symbols that are associated with the highest degree of uncertainty in the detected bits;
correcting the symbols in the identified locations as erasures and detecting and correcting up to $$\frac{2t-s}{2}$$

errors in the remaining ECC codeword symbols using a distance d error correction code, where the minimum distance $d_{min}=2t+1$.

8. The method of claim 7 wherein the step of setting the erasure pointers includes setting the pointers to identify the s symbols with the largest number of flagged bits.

9. The method of claim 7 wherein the particular value is 1 and the other value is 0.

10. The method of claim 7 wherein the particular value is 0 and the other value is 0.

11. The method of claim 7 wherein the predetermined number s is equal to the erasure correction capability of the error correction code.

12. The method of claim 7 wherein the step of setting the erasure pointers includes setting the pointers to identify the s symbols with the largest numbers of bits that are associated with the lowest confidence levels.

13. The method of claim 12 wherein the lowest confidence levels are the counts that are closest to the majority detection threshold.

14. The method of claim 13 wherein the lowest confidence levels are further associated with the counts that are farthest from the associated upper and lower thresholds.

15. A method of recovering data including the steps of
detecting bits in a data signal and assigning values to the bits;
determining counts of the number of times the respective bits are detected as particular values in multiple re-reads of the data signal;
reconstructing a ECC codeword by
assigning to bits that are associated with counts that are greater than a predetermined majority threshold the particular value,
assigning to bits that are associated with counts that are less than the predetermined majority threshold a different value,
flagging the bits that are associated with low confidence level bit counts,
grouping the bits into ECC codeword symbols,
identifying the locations in the codeword of s symbols that have the highest degree of uncertainty in the detected bits, and
using a distance d error correction code to correct the symbols in the identified locations as erasures and detect and correct up to $$\frac{2t-s}{2}$$

errors in the ECC codeword, where the minimum distance $d_{min}=2t+1$.

16. The method of claim 15 wherein the particular value is 1 and the other value is 0.

17. The method of claim 15 wherein the particular value is 0 and the other value is 1.

18. The method of claim 15 wherein the degree of uncertainty for a given symbol is determined based on the counts associated with the bits of the symbol and the highest degree of uncertainty corresponds to the largest numbers of bits that have counts closest to the majority threshold.

19. The method of claim 18 wherein the lowest confidence level for a bit assigned the particular value is an associated count furthest below a predetermined upper threshold that is above the majority detection threshold.

20. The method of claim 18 wherein the lowest confidence level is further for a bit assigned the other value an associated count furthest above a predetermined lower threshold that is below the majority detection threshold.

* * * * *

UNITED STATES PATENT AND TRADEMARK OFFICE
CERTIFICATE OF CORRECTION

| | | |
|---|---|---|
| PATENT NO. | : 7,634,706 B1 | Page 1 of 1 |
| APPLICATION NO. | : 11/481078 | |
| DATED | : December 15, 2009 | |
| INVENTOR(S) | : Michael H. Chen et al. | |

It is certified that error appears in the above-identified patent and that said Letters Patent is hereby corrected as shown below:

In the Specification, at column 7, line 62:

Please delete "other value is 0." and insert --other value is 1.--

Signed and Sealed this
Nineteenth Day of July, 2011

David J. Kappos
*Director of the United States Patent and Trademark Office*